United States Patent [19]

Green

[11] Patent Number: 5,148,609
[45] Date of Patent: Sep. 22, 1992

[54] ADJUSTING LOCATOR FOR CUTTING TOOLS

[75] Inventor: Richard S. Green, LaPeer, Mich.

[73] Assignee: GTE Valenite Corporation, Troy, Mich.

[21] Appl. No.: 680,863

[22] Filed: Apr. 5, 1991

[51] Int. Cl.⁵ .............................................. B23B 25/06
[52] U.S. Cl. ................................. 33/628; 33/633; 407/73
[58] Field of Search ............... 33/633, 634, 635, 640, 33/641, 628, 643; 407/73, 74, 75, 76, 85, 77, 38, 44

[56] References Cited

U.S. PATENT DOCUMENTS

| | | | |
|---|---|---|---|
| 1,050,455 | 1/1913 | Harrold | 33/633 |
| 2,496,800 | 2/1950 | Larkins | 33/628 |
| 2,559,950 | 7/1951 | Davis | 407/73 |
| 3,057,043 | 10/1962 | Hussey | 407/73 |
| 3,378,901 | 4/1968 | Dupuis | 407/38 |
| 4,055,101 | 10/1977 | Collins | 33/628 |
| 4,174,916 | 11/1979 | Kezran | 407/73 |
| 4,309,132 | 1/1982 | Adamson et al. | 407/38 |
| 4,428,704 | 1/1984 | Kalokhe | 407/76 |
| 4,519,142 | 5/1985 | Parker | 33/628 |
| 4,780,029 | 10/1988 | Beck | 407/77 |

FOREIGN PATENT DOCUMENTS 3637209  5/1988  Fed. Rep. of Germany ........ 407/76

Primary Examiner—Thomas B. Will

[57] ABSTRACT

An adjusting locator to adjust the axial position of a cutting insert in a cutting tool to eliminate cutting run out. The locator is comprised of a body, a flex flange substantially parallel to the body and spaced from the body by an adjusting groove. The flange is connected to the body by a bridge, which is defined between the adjusting groove and a flex groove whereby the flange flexes using the bridge as the fulcrum of the flex.

5 Claims, 3 Drawing Sheets

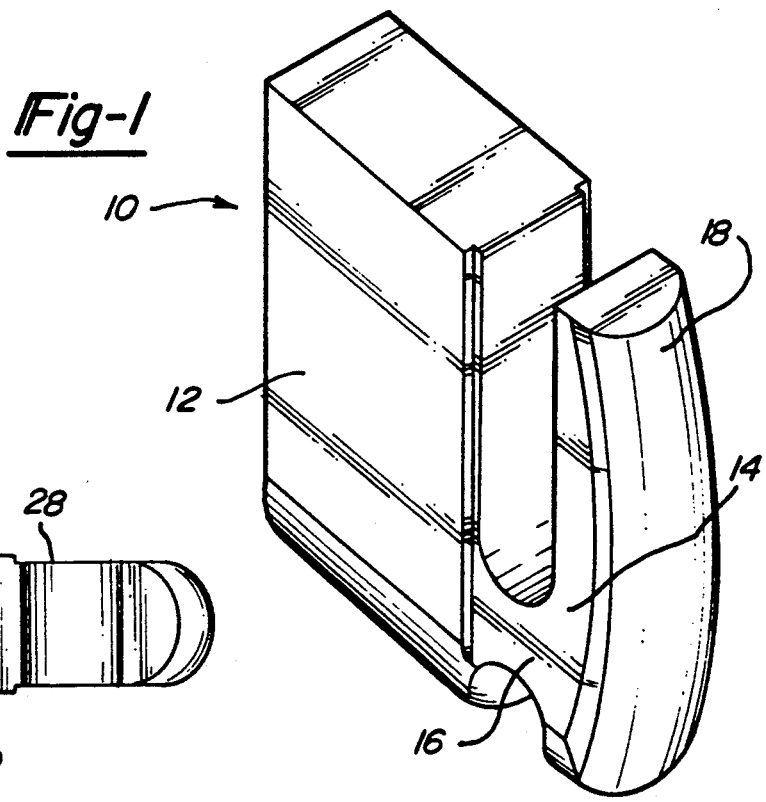
Fig-1
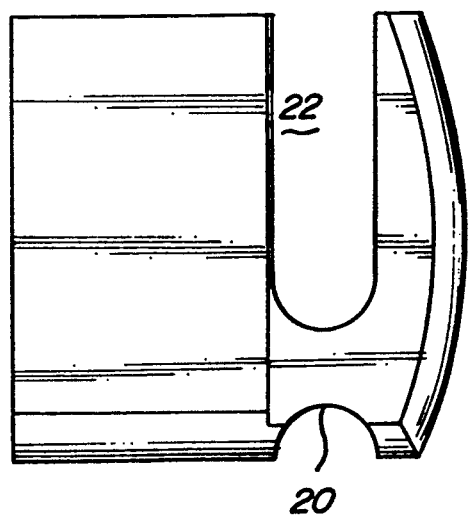
Fig-2
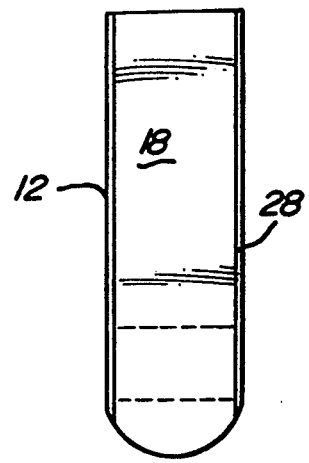
Fig-3
Fig-4

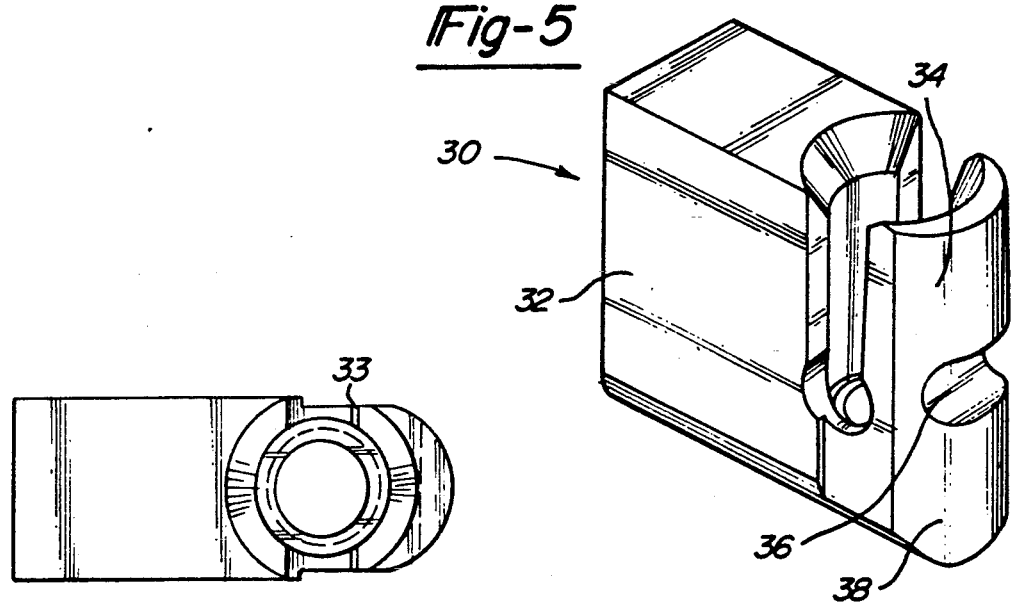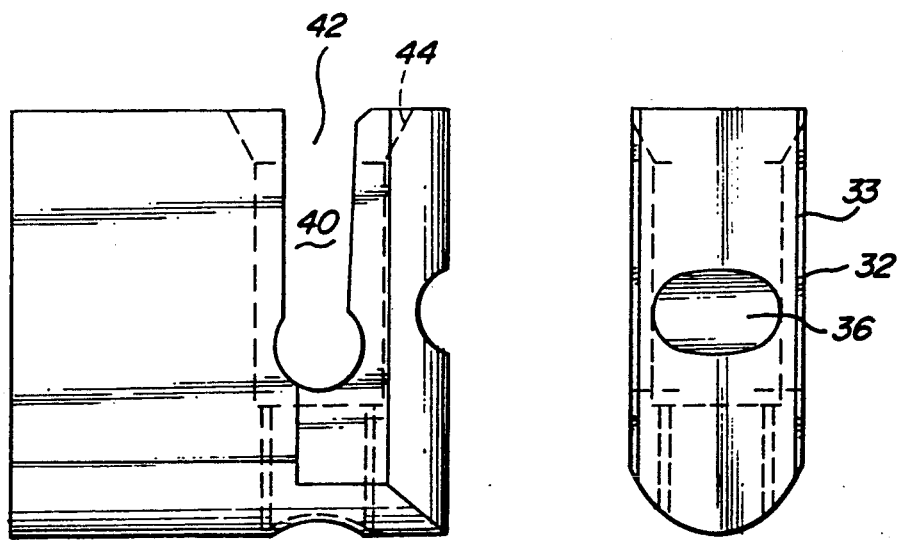

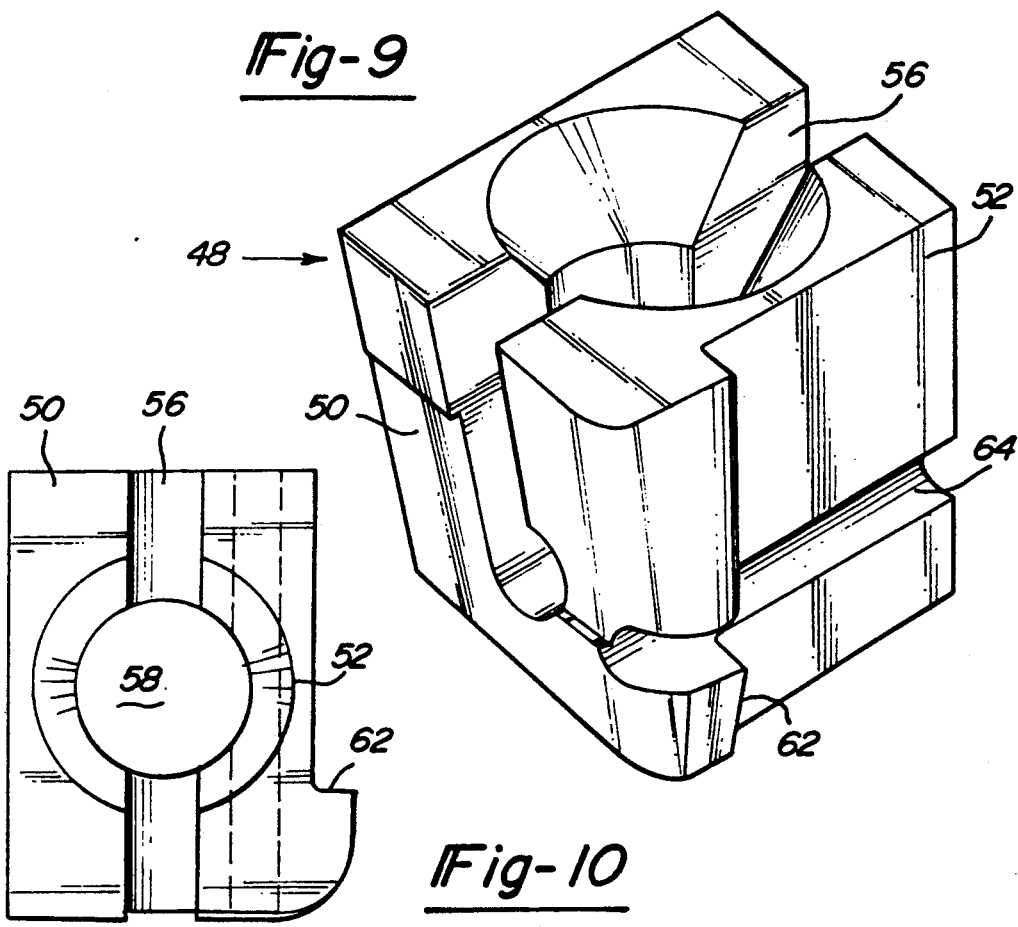
Fig-9
Fig-10
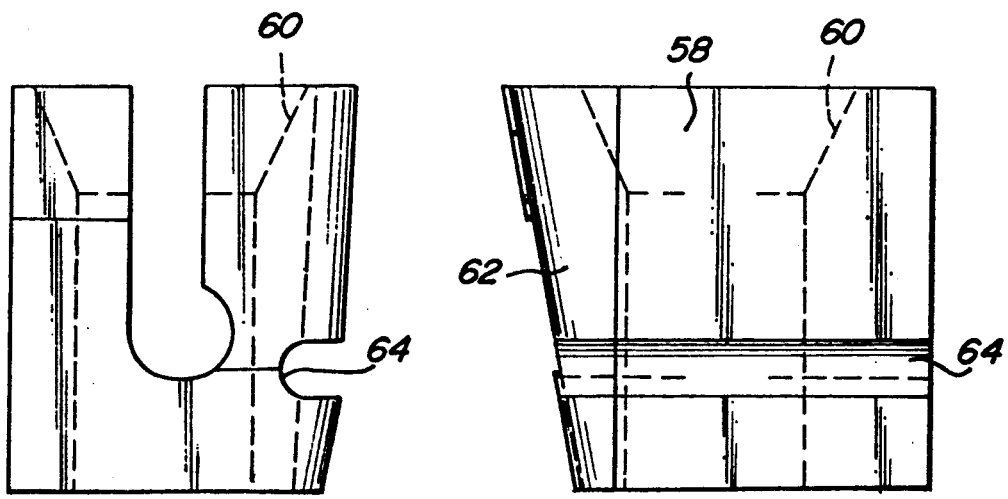
Fig-11
Fig-12

ADJUSTING LOCATOR FOR CUTTING TOOLS

BACKGROUND OF THE INVENTION

1. Field of the Invention

The present invention relates to a locator for adjusting and locating adjustable cutting inserts in a milling cutting tool.

The present invention further relates to an adjusting locator which is useful in locating inserts within a milling cutting tool with a minimum amount of effort and reduced labor costs.

The present invention relates to an adjusting locator for adjusting the axial position of cutting inserts in a milling cutting tool which does not require special tooling to allow the operator to accurately locate cutting inserts in the milling cutting tools.

The present invention further relates to a method for accurately locating the axial position of a cutting insert on a milling cutting tool.

2. Description of the Related Art

Adjusting cutting inserts in cutting tools, especially milling tools, has been a slow, tedious, time consuming and labor intensive effort. In the prior art, the axial position of the cutting insert depended upon the skill of the operator, and the accuracy of the dimensions of the insert. The axial position of the inserts was established by either a fixed locator tool for fixing the axial location of the insert and which relied upon the accuracy of the inserts to achieve axial run-out. Another method was the manual placement of inserts to the approximate axial location point. Another method was to use a face locating setting plate whereby a plate which has been milled or ground to a predetermined surface, was attached or affixed to the face of the milling tool, and the inserts were then forced against the plate into position. When all the inserts are in position, the plate is removed. This method may result in chipped inserts and eventually the locating plate becomes gouged, thereby necessitating regrinding of the locating surface.

The present invention overcomes all these shortcomings by providing a locator which is convenient and easy to use, is not labor intensive, and provides an exact setting for locating the axial position of a cutting insert in a cutting tool.

SUMMARY OF THE INVENTION

The present invention is directed to the accurate adjustment of inserts while the insert is in the cutting tool. This accurate adjustment is achieved by the use of an adjustable locator. The locator is a wedged shaped tool which has a notch cut into it to allow a portion of the locator to flex when pressure is applied to it by a simple hex wrench.

The adjustor itself is composed of a body having a groove cut transversely into one side of the adjustor body, and another groove cut into the body of the locator which extend more than half way through the length of the locator body so that the two groove described define a flange which is capable of being flexed when pressure is applied to the locator along the groove.

In operation, standard cutting inserts are loaded into the cutting tool, such as for example, a milling tool, and snugged into place against a standard wedge, such as is old and well known in the art. The locator is also placed into the tool with the flexible flange in close, touching proximity to the insert. The wedge may hold the adjustable locator in place. Once all the inserts are so loaded into the cutter body, the inserts may be set to cutting heights as follows.

A standard setting fixture with an indicator of insert position is placed in close, touching proximity to the inserts within the cutter body. An allen wrench, or other suitable hex key wrench, is placed into the groove extending more than half way through the locator body, and is turned so that the wrench forces the locator flange to flex against the insert. The insert is moved within the holder and its axial position is measured by the position locator placed in close proximity to the insert. When the desired axial position is achieved, the insert is secured into place. The present invention offers the advantage that cutting inserts can be set to very close or exact tolerances with less time and labor.

An object of the present invention is to provide a locator for adjusting the axial position of a cutting insert within a cutting tool body.

Another object of the present invention is to provide a method for adjusting the axial position of a cutting insert with minimal effort and labor.

Another object of the present invention is to provide an adaptable insert locator which is easy to manufacture and use.

Other objects of the present invention will become apparent to those of ordinary skill in the art upon a reading of the specification.

BRIEF DESCRIPTION OF THE DRAWINGS

FIG. 1 is a perspective view of one embodiment of the locator of the present invention.

FIG. 2 is a top view of the locator of FIG. 1.

FIG. 3 is a side view of the locator of FIG. 1.

FIG. 4 is a bottom view of the locator of FIG. 1.

FIG. 5 is a perspective view of another embodiment of the locator of the present invention.

FIG. 6 is a top view of the locator of FIG. 5.

FIG. 7 is a side view of the locator of FIG. 5.

FIG. 8 is a bottom view of the locator of FIG. 5.

FIG. 9 is a perspective view of another embodiment of the locator of the present invention.

FIG. 10 is a top view of the locator of FIG. 9.

FIG. 11 is a side view of the locator of FIG. 9.

FIG. 12 is another side view of the locator of FIG. 9 which is a side adjacent to that depicted in a flex groove FIG. 11.

DETAILED DESCRIPTION OF THE PREFERRED EMBODIMENTS

Turning now to the drawings, wherein like numerals depict like structures, and particularly to FIGS. 1 through 4, insert adjusting locator 10 is comprised of body 12 having a flex flange 14 which is substantially parallel to the body is attached to the body by means of bridge 16. The body and bridge are usually comprised of a flexible durable material such as steel or the like, but it is contemplated that hard, durable flexible plastics may also serve as suitable material. The bridge is defined as a connection between the flex flange and the body wherein the adjustment groove 22 extends at least half way through the length of the body and a flex groove 20 is formed opposite the adjustment groove. The flex flange is therefore connected to the body in such a manner as to allow the flange to be flexed and then to return to its original position. It should be evident to those of ordinary skill in the art that the flange is flexed along the bridge because the flex groove allows the operator to apply pressure along the adjustment groove and that pressure causes the flange to flex, using the bridge as the fulcrum of the flange. The flexible resilient nature of the locator material is such that the flange "springs" back to its preadjustment configuration as is expected when using such resilient materials.

The flange has a radiused surface 18 extending along its length and further has relieved surfaces 28 relative to body 12 so that the locator may be snugged into place in the cutting tool and the flange area is therefore not restricted in its movement by virtue of that fact.

In operation, the locator of this embodiment is put into place into a cutting tool, for example a milling tool, and held in place by a wedge member, which in turn, further holds the cutting insert in its position. When all the inserts are placed onto the milling cutter, and all the wedges are snugged into position, a standard setting fixture with an indicator is placed in touching proximity with the inserts tips. An allen wrench or other multi faceted tool is inserted into the adjustment groove and the operator rotates the allen wrench within the adjustment groove so that pressure is brought to bear against the flex flange. The flange flexes and the radiused surface on the flange contacts the insert, thereby forcing it into the desired axial position, as measured by the locating means, which is usually a gauge. When the insert is in its desired position, the wedge member is tightened into place, thereby securing the insert in its desired position, and the process is continued until the cutting tool's entire compliment of cutting inserts are secured into the desired axial position. This ability to set the inserts accurately eliminates the phenomena of "run out" in the cut, which has been a concern when milling operations or other cutting operations are involved.

In another embodiment, as seen in FIGS. 5 through 8, locator 30 has body 32 and flex flange 34. The flex flange has flex groove 36 located on the flex flange and extending below the midpoint of the length of the flange. The flex groove is oriented transverse to the flex flange and is on surface 38 of the flex flange. As is the case in the previous embodiment, the flange is relieved along surfaces 33 relative to the body so that it may be moved even when the adjustor is held in place by means of a wedge as is the case in milling operations.

The adjustment groove 40 terminates in a threaded aperture 42 at one end, and has a countersink 44 at its opposite end. A screw which extends the length of the adjusting groove is threaded into place into the threaded aperture. When it is desired to cause the flex flange to flex, the screw is threaded into the threaded aperture, and the head of the screw engages the countersink area of the adjusting groove. As the screw is tightened, it causes the flange to flex along the flex groove, thereby moving surface 38 into substantial contact with the inserts to be adjusted.

Turning now to FIGS. 9 through 12, there is depicted therein another embodiment of the adjusting locator of the present invention. In this embodiment, adjustor 48 is comprised of body 50, which is equipped with flex flange 52, which is formed by adjustment groove 56 bisecting the body. The flex groove 64 is located along the flex flange and is transverse to the flex flange itself. The body has a central aperture 58 which has a countersink 60 at one end through which extends a screw, which is not shown. The screw is threadably engaged into the body of the cutting tool, not shown, and is thereby secured into place on the cutting tool.

The flex flange has a locating surface 62 which is placed in close touching proximity with the insert to be adjusted. When it is desired to adjust the insert, a locating gauge is placed onto the top surface of the insert to be adjusted, and the screw in the central aperture is advanced or withdrawn form the central aperture, as required, in order to flex the flange along the flex groove. The flex flange then engages the insert and the insert's axial position is adjusted.

Those skilled in the art understand that many modifications can be made to the adjusting locator of the present invention without departing from the scope or spirit of the present invention.

I claim:

1. An adjusting locator for adjusting the axial position of the cutting insert in a cutting tool, said adjustor comprising:
   (a) a body having sides and a length and width said body comprised of a resilient material; and
   (b) a flex flange having an insert contact surface, said flange oriented substantially parallel with said body and connected to said body by a bridge, and spaced from said body by an adjusting groove, said bridge defined by said adjusting groove and a flex groove, said flex flange being relieved along its sides relative to said body sides.

2. The adjusting locator of claim 1, wherein said adjusting groove has an aperture therethrough, said aperture having a countersink at one end thereof.

3. The adjusting locator of claim 2, wherein said aperture is centrally located in said adjusting groove.

4. The adjusting locator of claim 2, wherein said adjusting groove is threaded at the end opposite to said countersink.

5. A method for adjusting the axial position of a cutting insert in a cutting tool to avoid cutting run out, said method comprising:
   (a) positioning an adjustor locator having a body, a flex flange substantially parallel to said body and in contact to said body by a bridge, said bridge defined by an adjustment groove and a flex groove, said flange having an insert contact surface in close proximal relation to a cutting insert in a cutting tool;
   (b) placing a locating gauge into position relative to said cutting insert;
   (c) forcing said flex flange into contact with said insert, thereby moving said insert into the desired position as determined by the locating gauge;
   (d) securing said insert in a desired position; and
   (e) releasing said force on the flange to allow the flange to return to its original position.

* * * * *